United States Patent [19]

Vecchiatto

[11] 4,386,344
[45] May 31, 1983

[54] ELECTRONIC EDGE AND CENTER LOCATOR AND METHOD OF USING SAME

[76] Inventor: Charles L. Vecchiatto, 22601 Dunkenfield Cir., El Toro, Calif. 92630

[21] Appl. No.: 254,922

[22] Filed: Apr. 16, 1981

[51] Int. Cl.³ .............................................. G08B 21/00
[52] U.S. Cl. ...................................... 340/680; 29/406; 33/174 L; 340/686
[58] Field of Search ............... 340/680, 678, 686, 540, 340/635; 29/406, 407; 33/174 L; 307/119, 116; 200/61.41, 61.42, 56 R

[56] References Cited

U.S. PATENT DOCUMENTS 2,109,976  3/1938  Pierce, Jr. ........................ 33/174 L
2,490,483  12/1949  Simer .................................. 340/686
3,307,267  3/1967  Barr et al. ......................... 33/174 L Primary Examiner—Glen R. Swann, III
Attorney, Agent, or Firm—Knobbe, Martens, Olson, Hubbard & Bear

[57] ABSTRACT

An electronic edge and center locator is a device for setting up a machine tool so that a tool holding chuck is aligned with a workpiece to be machined. The electronic edge and center locator has a metal probe for contacting a workpiece and the probe has an insulated shank for mounting in the chuck of a machine tool. The electronic edge and center locator includes electronic circuitry for detecting when the probe makes electrical contact with the workpiece. The circuitry provides visual indication of normal probe operation and indication when contact between the probe and the workpiece is detected. Mounting of the probe in the chuck of the machine tool provides a highly accurate method of precisely determining the spatial relationship between a workpiece and the machine tool. The method of using the probe and its associated electronics includes a sequence of steps of moving the workpiece with respect to the machine tool in order to cause the probe to make contact with the workpiece in a plurality of locations. The relative location of contacts indicated between the probe and the workpiece is used to accurately determine the relative position of the workpiece with respect to the machine tool chuck and spindle so that the location of the machine tool spindle center line is accurately determined.

15 Claims, 10 Drawing Figures

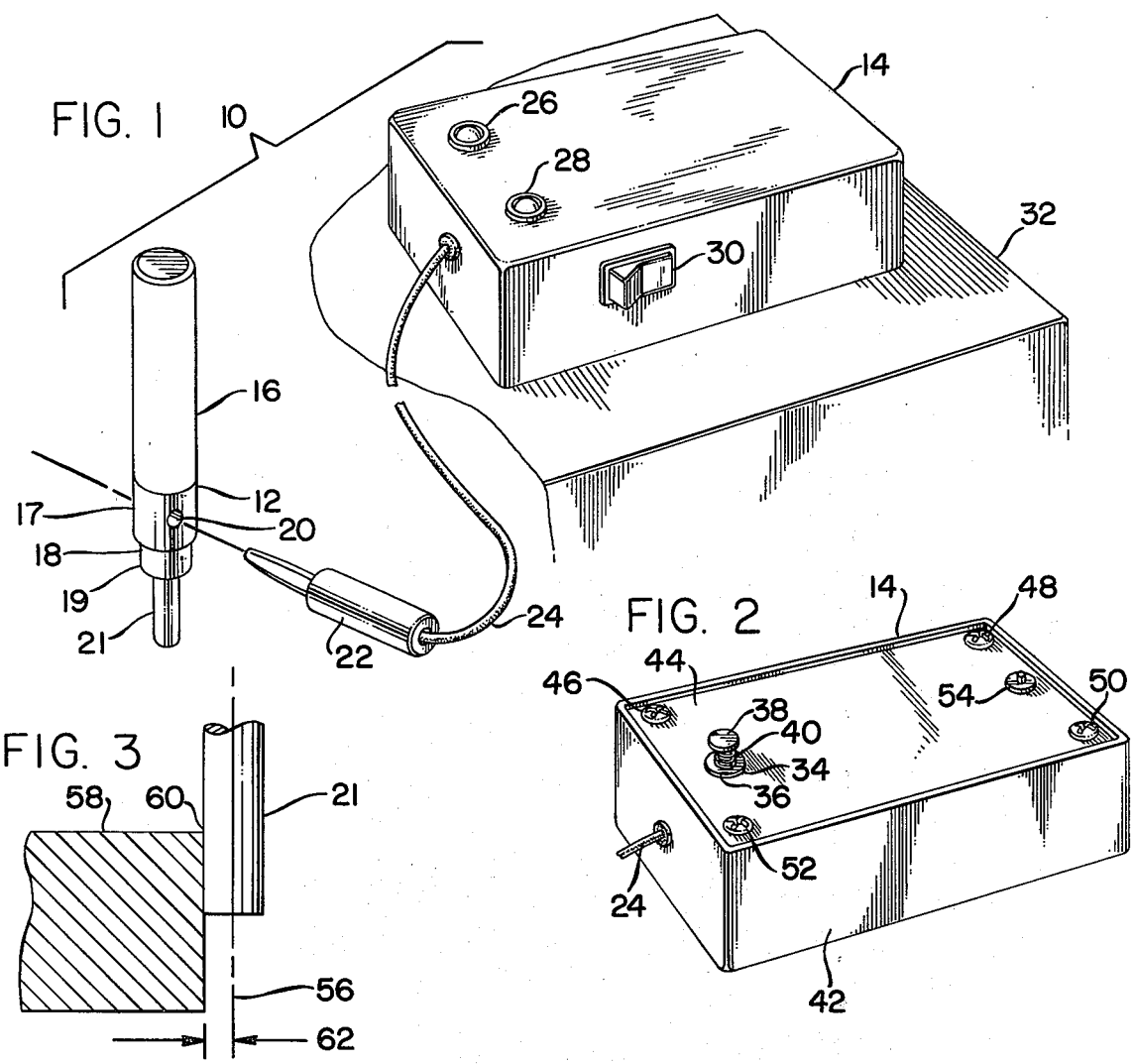
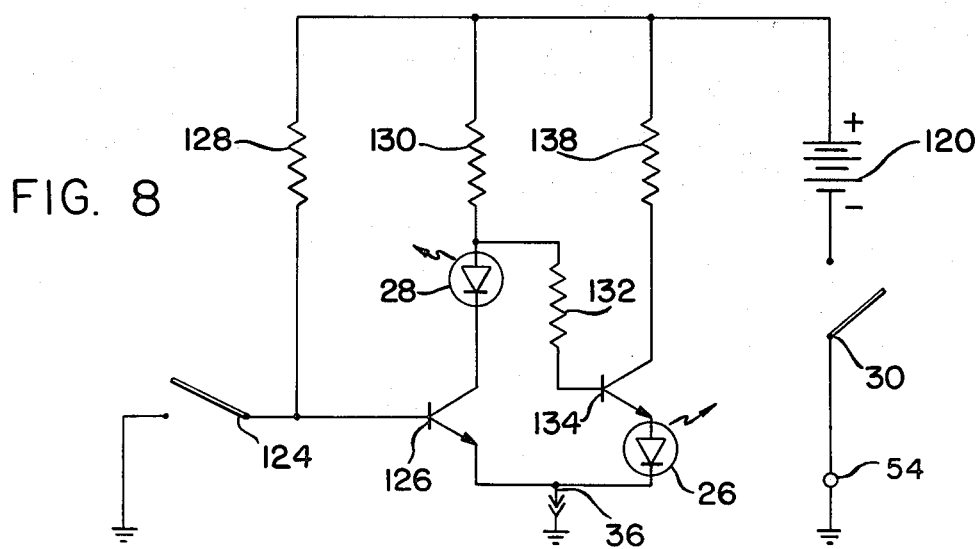

ELECTRONIC EDGE AND CENTER LOCATOR AND METHOD OF USING SAME

FIELD OF THE INVENTION

This invention relates to an electronic contact detector that is particularly useful in aligning a machine tool so that a workpiece may be accurately machined.

BACKGROUND OF THE INVENTION

A major problem encountered in the metal fabricating industry is the need to machine holes, slots, grooves and the like in predetermined positions in a workpiece and to perform the machining with a high degree of precision and accuracy. Machine tools (such as a drill press or milling machine) used for machining generally include a chuck for holding a tool bit or cutter and a workpiece holder for holding a workpiece. The workpiece holder may be a vise or a jig and is usually slidably mounted on the machine tool and its position may be adjusted by handcranks with graduated dials. A problem is encountered due to the fact that it is difficult to precisely position the workpiece with respect to the chuck. The relative positioning of a tool bit held by the chuck and the workpiece is crucial to attaining accuracy and precision in performing a machining operation. For example, if a hole is to be bored in a preselected position in a workpiece, the workpiece must be precisely aligned with and positioned with respect to a tool bit which is to machine the bore.

Various types of electrical and non-electrical devices have been used in the past in order to attempt to correctly align the chuck of a machine tool with a workpiece. A major problem with most prior devices is that in order to make a center location or edge measurement, it was required that the chuck of the machine tool be rotated. For example, a non-electric center locator used in the past had a shank with a spring loaded contact sensor mounted thereon. Such a prior center locator would be mounted in the chuck of a machine tool with the spring loaded contact mounted off axis from the shank. As the chuck was rotated, the workpiece would be manually moved to the contact until the contact is pushed into axial alignment with the shaft. Then the operator continues to move the workpiece a small distance until the contact pops out of axial alignment with the shaft so that the operator can visually notice the point of axial alignment. Based on the position noted by the operator, approximate alignment between a tool bit and the workpiece could be computed.

A prior type of electrical center locator included the use of a pivoting arm mounted on a shank and connected to an electric light. The pivoting arm would be manually pivoted into an off axis position from the shank and the shank would be mounted in the chuck of a machine tool. The chuck of the machine tool would be rotated and the workpiece would be moved into contact with the pivoting arm. As the workpiece was moved, the pivoting arm would be displaced until the pivoting arm was in axial alignment with the shank. A circuit would be used to control the light so that the light would turn off when the pivoting arm was in axial alignment with the shank.

A problem with prior center locator devices and methods is that accuracy and precision of such prior devices and methods depended upon precise tolerances which were difficult to achieve in their manufacture and operation. Another problem with the prior center locator methods is that undue amounts of time and operator's skill were required in order to obtain acceptable results. A further problem with the prior devices and methods is that rotation of the machine tool chuck was required in order to perform the measurements. A further problem with the prior devices and methods is that the probes provided lacked versatility to adapt to unusual workpiece shapes, and the probes used were unduly expensive.

SUMMARY OF THE INVENTION

Accordingly, the electronic edge and center locator of this invention provides a probe for mounting in the chuck of a machine tool and circuitry for connection to the probe in order to allow a workpiece to be precisely and accurately aligned with respect to the chuck of the machine tool. The probe includes a shank portion for clamping in the chuck of the machine tool. The shank portion is preferably aluminum and has an anodized covering which is electrically insulating and which insures that the probe is electrically isolated from the chuck of the machine tool. The electronic edge and center locator of this invention is inexpensive, durable, has no moving parts itself, and may be used for inspecting and checking work in a machine tool before breaking down the setup of the workpiece in the work holder. The edge locator of this invention may be operated so that backlash due to wear in the machine tool may be easily automatically compensated for.

The edge locator of this invention is rugged, durable and has no moving parts itself to wear out. The probe also has a contact detecting tip portion which is coaxial with the shank portion of probe and which is shaped to make electrical contact with the workpiece as the workpiece is brought into mechanical contact with the probe. The contact detecting tip portion of the probe is also equipped with a transverse bore which is sized to accept an electrical connector from the circuitry used in the invention to detect contact between the probe and the workpiece. Overall, the probe is unitary and simple in construction and may be easily fabricated and operated. A wide variety of probe shapes and sizes may be easily made for use with a variety of machine tools and workpiece shapes and sizes.

The electronic circuitry of this invention is self contained and is mounted inside a small circuit box which may be placed on any metal part of the machine tool. Electrical contact between the metal machine tool and the circuit box is provided by a spring loaded connector mounted on the underside of the box in order to make a spring biased contact with the machine tool. The electronic box includes an on/off switch, and a pair of indicator lights, the first light of which indicates that adequate electrical contact is made between the box and the machine tool and that the strength of the batteries inside the box is adequate, and the second of which indicates when electrical contact is made between the contacting portion of the probe and the workpiece mounted in the machine tool.

The circuitry of this invention does not require an external power supply but includes a small storage battery, a pair of switching transistors, a pair of light-emitting diodes, four resistors, and an on/off switch. The circuitry is compact to allow ease of use and it is battery operated to avoid the inconvenience of any requirement for AC line power and avoids possible injuries due to electrical shocks.

SUMMARY OF THE DRAWINGS

FIG. 1 is a partially cut away perspective view of the electronic edge and center locator of this invention showing the probe and the electronic box, with the electronic box shown in contact with a machine tool.

FIG. 2 is a partially cut-away perspective view of the electronic box showing the underside of the box and the spring-loaded connector mounted thereon.

FIG. 3 is a cross-sectional side view of a workpiece and the contacting portion of the probe of this invention.

FIG. 8 is an electrical schematic diagram of the electronic circuitry of this invention.

DETAILED DESCRIPTION OF THE PREFERRED EMBODIMENT OF THE INVENTION

Figure 4:
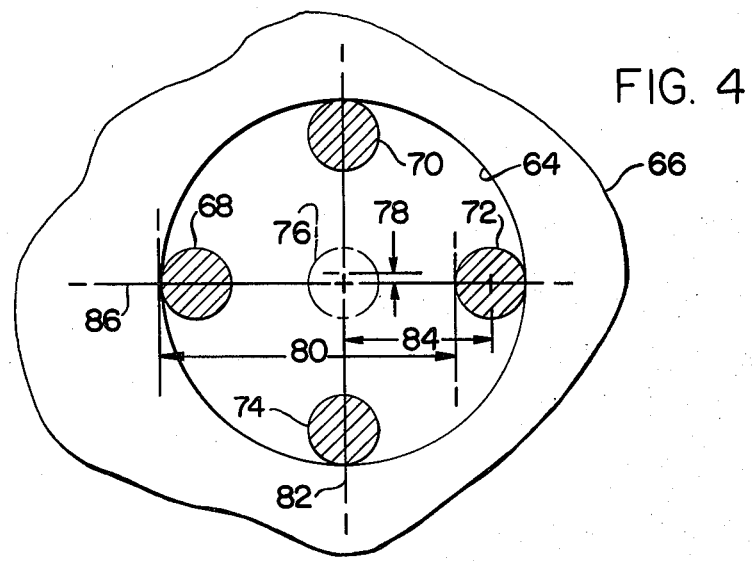
FIG. 4 is an overhead view of a workpiece having a circular hole therethrough and showing various positions of the probe of this invention inside the circular hole in the workpiece.

Referring first to FIG. 1, the electronic edge and center locator 10 includes a probe 12 and electronics box 14. Probe 12 is preferably composed of one single solid aluminum bar having an upper shank portion 16 and a contact detecting lower portion 18. The shank portion 16 is preferably dip anodized so that the shank 16 is covered with a thin electrically insulating layer of aluminum oxide. The shank 16 is shaped as an elongated, circular solid rod which has a diameter which nicely fits within the chuck of a machine tool (not shown).

The contact detecting lower portion 18 of probe 12 extends from the shank 16 and is preferably bare (non-oxidized aluminum). The portion 18 is preferably coaxial with the shank 16 and may take a variety of shapes including a step tapered shape as shown in FIG. 1. The lower portion 18 tapers from a barrel 7 (equal in diameter to the shank 16), to a step 19, and then to a tip 21 which is preferably shaped like a straight-sided solid cylinder. The probe 12 is further equipped with a transverse bore 20 extending through the probe 12 to act as female electrical connector for making electrical contact with the probe 12.

While the probe 12 is preferably composed of aluminum, it may be composed of any electrically conductive solid including brass, steel, and the like. It is preferable that the probe 12 be of simple, easily fabricated construction, and be inexpensive so that if damaged, probe 12 may be replaced without undue cost. The preferred embodiment of the probe 12 described herein may be easily and inexpensively fabricated on a lathe and the shank 16 may be anodized using the inexpensive commercial dip anodization process. It is anticipated that probe 12 may be accidentally bent with careless use so that the portion 18 is no longer coaxial with the shaft 16. Such bending of the probe 12 will render it much less suitable for its function of locating edges and centers.

The coating for the shank 16 is preferably an anodized layer which is approximately 0.0002 inches thick and which is preferably uniform in thickness around the circumference of the shank 16. The dip anodizing process by its very nature creates a uniform thickness layer. In order for the accuracy of the probe 12 to be high, it is important that the shank 16 be concentric and coaxially aligned with the contact detecting lower portion 18. A thin anodized layer on the shank 16 provides the necessary electrical insulation without impairing the concentricity and axial alignment of the shank 16. In practice, the anodized layer on shank 16 is formed by immersing the probe 12, with the shank 16 downward, into a liquid anodizing solution so that the aluminum below the contacting portion 18 is oxidized. In general, commercial anodizing techniques used in the past are capable of producing an anodized layer on the shank 16 of a controlled, uniform thickness. The anodized layer on shank 16 is also mechanically durable so that it will not be damaged when mounted in the chuck of the machine tool and its insulating properties will not be degraded. Many alternate methods may exist of providing a durable coating of a uniform thickness on the shank 16.

The electronic box 14 includes a connector 22 (preferably a banana plug) and a wire 24 connected between the connector 24 and the electronic box 14. The connector 22 inserts into the bore 20 of the probe 12 to provide electrical contact between the wire 24 and the probe 12. Alternatively, a clip (not shown) may be connected to wire 24 so that the clip may be placed in gripping contact around the barrel 17 to provide electrical contact therewith. The electronic box 14 also has a red light-emitting diode indicator 26 and a green light-emitting diode indicator 28. An on/off switch 30 is provided in electronic box 14 to selectively disconnect the power from circuitry inside box 14. The purpose of indicator 28 is to display a green light when adequate electrical contract is maintained between electronic box 14 and the machine tool 32 and also to indicate that the state of charge of batteries inside box 14 is adequate. The purpose of indicator 26 is to display a red light to indicate when the contact detector 18 has been brought into contact with a workpiece (not shown) so that an electrical circuit is completed between the box 14, through the wire 24, connector 22, probe 12, the workpiece (not shown), and the machine tool 32. The electronic box 14 is placed on the metal machine tool 32 and makes contact with it. A metal workpiece (not shown) is clamped in the work holder (not shown) of the machine tool 32.

Referring next to FIG. 2, the underside of electronic box 14 is shown. A spring-loaded contact 34 is mounted on the underside of the box 14 and serves to make spring-biased electrical contact with the machine tool 32 (see FIG. 1). The contactor 34 includes an insulative washer 36 which is securely attached to the bottom 44 of the box 14. A metal, electrically conducting plunger 38 is slidably mounted inside the washer 36 and projects from the bottom of the box 14 to make physical contact with the machine tool 32. A helical-coil spring 40 is mounted between the plunger 38 and the washer 36 and serves to force the plunger 38 into contact with the machine tool 32. The purpose of the contactor 34 is to provide reliable electrical contact between the machine tool 32 and circuitry inside the electronics box 14. The purpose of the washer 36 is to electrically insulate the plunger 38 and spring 40 from the box bottom 44.

The electronic box 14 includes a plastic electrically insulating shell 42 having a removable aluminum bottom 44 secured to the shell 42 by four self-threading screws 46, 48, 50 and 52. A metal rivet 54 is mounted through the bottom cover 44 and makes electrical contact with the bottom cover 44, and the screws 46, 48, 50 and 52. The green indicator light 28 (See FIG. 1) is turned on by the circuitry inside box 14 when the switch 30 (See FIG. 1) is on and electrical contact is provided between the plunger 38 and the rivet 54 by the metal machine tool 32. The purpose of using the green indicator light 28 to detect when a circuit is completed between the plunger 38 and the rivet 54 is to insure that an indication is provided to the user of the center locator 10 when the electronic box 14 makes adequate electrical contact to the machine tool 32. Thus, the green indicator light 28 provides an easy method for the operator of the center locator 10 to know when the center locator 10 is ready for use (i.e., when the batteries inside box 14 are providing sufficient power and when the machine tool 32 is sufficiently corrosion-free and clean so that adequate electrical contact is made by the box 14 with the tool 32.

Referring next to FIG. 3, the tip 21 of the contact detecting lower portion 18 of probe 12 has a center line 56 which is also the axis of probe 12. The tip 21 makes mechanical contact with the edge 60 of a workpiece 58. The distance between the edge 60 and the center line 56 is denoted 62 and is equal to the radius of the tip 21. In detecting edges with the locator 10, the operator must keep in mind and compensate for the distance 62 in as much as it is desirable in machine tool work to correlate the position of the center line 56 (which usually is the axis of a machine tool spindle) and the position of the edge 60. It is preferable that the diameter of the tip 21 be equal to 0.2 inches with a tolerance of 0.0002 inches. It is important that the radius distance 62 be precisely know to the operator of the locator 10 so that accurate alignment between the machine tool spindle and the workpiece can be achieved.

Referring next to FIG. 4, the steps used in locating the center of a hole 64 in a workpiece 66 are illustrated. Five positions (68, 70, 72, 74 and 76) for the tip 21 are shown inside the circular hole 64. In practice the tip 21 is moved between the positions 68, 70, 72, 74 and 76 by moving the workpiece 66 with respect to the spindle of the machine tool. Workpiece 66 may be mounted in a work holder which is adjustably mounted for movement in a horizontal plane on the machine tool. Graduated dial handcranks may be provided on the machine tool to control the distance over which the work holder is moved. The center locator 10 allows an operator to align the spindle of the machine tool with the center of circular hole 64 without removing the workpiece 66 from its workholder and so that the relative position of the spindle and the workpiece 66 may be accurately determined. The center locator 10 also allows an operator to check and inspect the alignment and positioning of holes, slots and the like machined in workpiece 66 without breaking down the setup of the workpiece 66 in the work holder. It is desirable that alignment between the spindle and the center of hole 64 be achieved so that further machine work to be performed on workpiece 66 may be precisely aligned with the hole 64. For example, if a slot where to be milled a predetermined distance away from the hole 64, the operator would first align the spindle of the machine tool with the center of the hole 64 using the center locator 10. The operator next would calculate the required distance from the center of the hole 64 to the slot to be milled. Next the operator would place the slot cutting tool in the machine tool spindle and move the workpiece over the distance just calculated using the graduated handcranks on the machine tool work holder. Having thus placed the slot cutting tool at its proper location, the operator would begin the machining operation.

The procedure for finding the center of the hole 64 using the center locator 10 is to first position the workpiece 66 so that the tip 21 is approximately centered in the position 76 at the center of the hole 64. This step of approximately centering the tip 21 is accomplished by using a separate measuring rule or by using the dial cranks of the machine tool alone. When approximately centered, the probe tip 21 should be within a distance 78 of having its center aligned with the exact center of the hole 64 as indicated by the position 76. The error distance 78 for the initial approximation should be 0.03 inches or less. After the probe tip 21 has been approximately centered to the position 76, the switch 30 (see FIG. 1) is turned on and the operator checks to see that the green indicator light 28 is on. If the green indicator light 28 is not on, the operator lifts the box 14 from the machine tool 32, cleans the surface of the machine tool 32, and replaces the box 14 to try again. The operator then moves the workpiece 66 just enough so that the red light 26 comes on and the probe 21 is in the position 68 contacting the workpiece 66. The operator notes the position of the dials on the cranks when the prove 21 is in the position 68. The operator turns the cranks so that the probe 21 is urged away from the workpiece until the backlash in the machine tool is taken out and the red light 26 goes out. This method of easy, automatic backlash compensation is made possible by the instantaneous operation of red light 26. The operator then moves the workpiece by adjusting the cranks so that the light 26 again comes on and the tip 21 is in the position 72. The operator notes the settings of the feed screw dials when the tip 21 is in the position 72. The operator then computes the distance 80 by mathematically comparing the dial graduation settings for the position 72 with those of position 68. The operator then determines the position of the center line 82 by computing the distance 84 which is equal to the radius of the probe 21 subtracted from one-half of the distance 80. The preceding series of computations is made in order to determine the machine tool crank dial setting corresponding to the center line 82.

After determining the location of the center line 82, the operator repeats the procedure by first placing the center of the probe tip 21 on the center line 82 and observing the light 26 in order to place the tip at the two postions 70 and 74, in sequence, and thus computes the location of the center line 86. If the steps of the procedure have been followed correctly, the intersection of the center lines 82 and 86 form a center estimate which should be close to the center of the circular hole 64.

Figure 5:
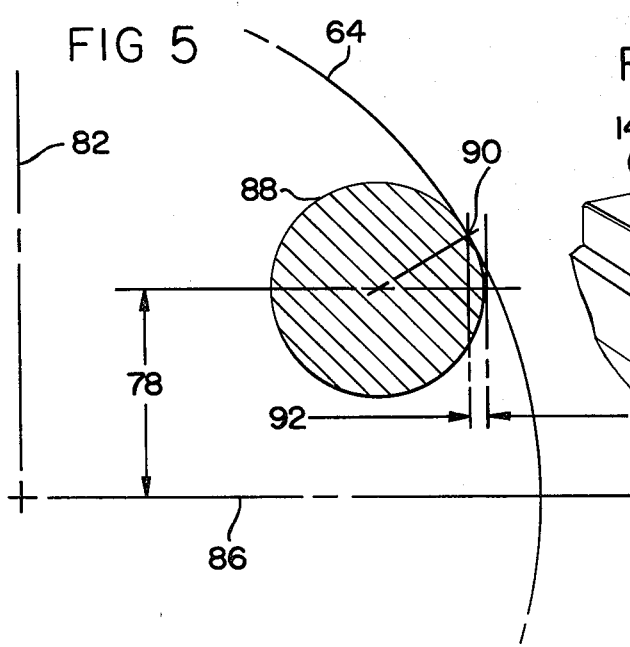
FIG. 5 is an overhead view of a workpiece having a circular hole therethrough and showing the probe of this invention inside the hole of the workpiece.

Referring next to FIG. 5, the effect of a chordal contact error is illustrated. If the distance 78 used as an initial approximation is too large, then the procedure outlined above in the description of FIG. 4 may not produce accurate determinations of the center lines 82 and 86. The chordal contact error occurs because the probe 21 reaches a position 88 which contacts the wall of the circular hole 64 at a point 90. A radius of the probe tip 21 passing through the point 90 is not parallel to the center line 86 and thus a chordal error distance 92 results when the estimate of the position of center line 82 is computed. The size of the chordal error distance 92 will increase with the increasing size of the distance 78.

A procedure for minimizing the effect of the chordal error distance 92 and more accurately determining the position of the center lines 82 and 86 is to repeat the steps discussed above in conjunction with FIG. 4. That is, the estimated position where center lines 82 and 86 cross is determined by the steps listed above in conjunction with FIG. 4, and then the steps are repeated with the probe 21 being placed initially at the estimated position where the lines 82 and 86 cross. That is, the sequence of steps of moving the tip 21 is repeated to arrive at better and better approximations of the location of the center of the hole 64, with each approximation being used as the starting point for making a better approximation. This process may be repeated as many times as is desired in order to determine the positions of lines 82 and 86 to increasing degrees of accuracy. In practice, the sequence of steps is repeated until the center of the hole 64 is located to within a prespecified tolerance figure.

As mentioned above, the sequence of steps allows the user of the center locator 10 to estimate the position of the centerline 82. Repeating the series of steps allows the operator to refine the estimate for the location of the centerline 82 to become closer and closer to the actual location of the centerline 82. The differences between the successive estimates of the location of the centerline 82 indicate the accuracy to which the centerline 82 has been estimated. The series of steps should be repeated until such time as the difference between successive approximations for the centerline 82 is less than the prespecified tolerance figure, since the difference between successive estimates of the centerline location decreases as the sequence of steps is repeated.

Figure 6:
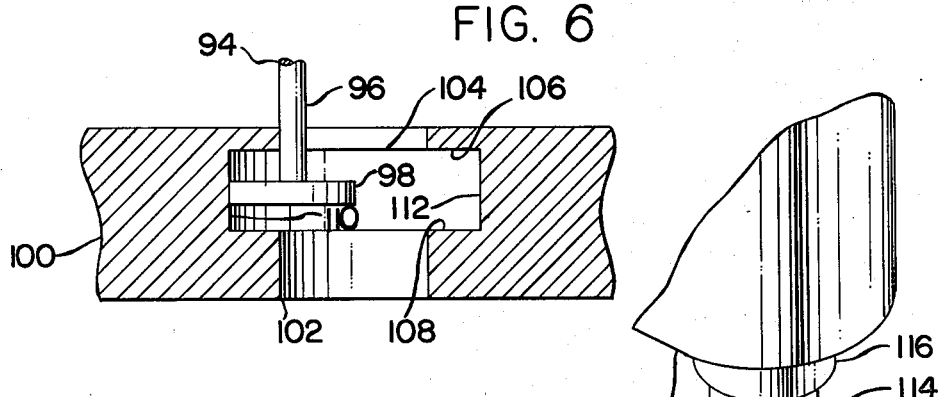
FIG. 6 is a partially cut away side, cross-sectional view of a workpiece having an internal "O-ring" groove and showing especially shaped probe for use with such a workpiece in this invention.

Referring next to FIG. 6, an alternate embodiment for the probe 12 is shown as the probe 94 which consists of a long, circular rod-like shank 96 having a flat, circular disk 98 mounted on the lower end thereof. The shank 96 may be composed of aluminum and anodized in the same way as the shank 16 of FIG. 1. The probe 94 is an example of a probe which is especially constructed to be used with intricate workpiece shapes. The workpiece 100 has a circular bore 102 therethrough. The bore 102 has a circumferential "O-ring" groove recessed inside the workpiece 100, coaxial with the bore 102. The groove 104 has an upper surface 106, a lower surface 108 and a circumferential sidewall surface which extends from the side 110 to the side 112. The workpiece 100 may be moved so that the probe 94 makes contact with the side 110, and then makes contact with the side 112 so that the axis of the groove 104 may be located using the steps described above in conjunction with FIG. 4. The disc 98 is made with a larger diameter than the shank 96 so that the disk 98 will make electrical contact with the workpiece 100 without the shank 96 coming into contact with the workpiece 100. That is, the disk 98 of the probe 94 performs a function analogous to the tip 21 of the probe 12.

If the thickness of the disk 98 is known, the locations of the upper surface 106 and lower surface 108 of the groove 104 may be determined using the probe 94. The location of such vertical positions is important to allow calibration of the vertical feed or depth gauge of the spindle of the machine tool.

Figure 7:
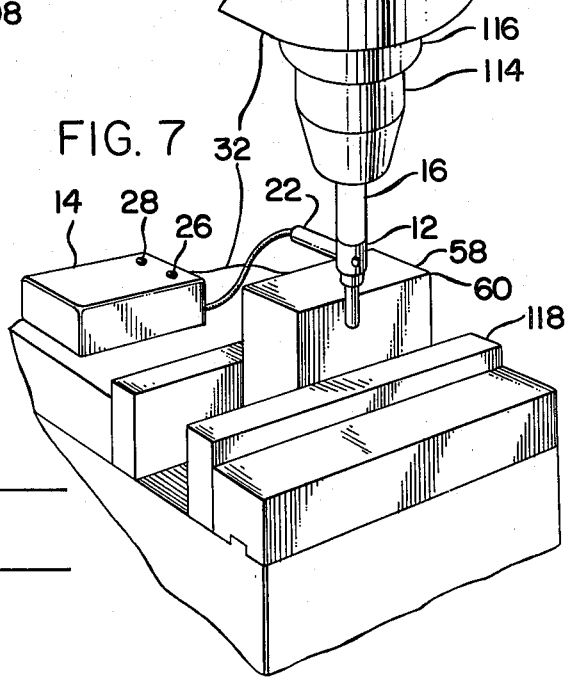
FIG. 7 is a partially cut away perspective view of the electronic edge and center locator of this invention showing the probe mounted in the chuck of a machine tool and positioned adjacent to a workpiece and further showing the electronic box mounted on the machine tool.

Referring next to FIG. 7, the probe 12 is mounted in the chuck 114. The chuck 114 is mounted on the machine tool spindle 116. A function of the chuck 114 is to hold tool bits (not shown) and to transmit rotation from the spindle 116 to the tool bit mounted in the chuck 114 so that machining may occur. For the purpose of locating an edge or a center, the shank 16 of the probe 12 is mounted in the chuck 114 so that the probe 12 is coaxial with the chuck 114 and the spindle 116. After an edge or center is located using the probe 12, a tool bit (not shown) may be mounted in the chuck 114 and the workpiece 58 may be moved (using the edge or center location information) so that the tool bit will be precisely positioned for the desired machining.

The spindle 116 and chuck 114 are parts of the machine tool 32 which also includes a workpiece holer 118. The workpiece 118 is slidably mounted on the machine tool 32 and is connected to dial cranks (not shown) for precisely controlling the horizontal movement of the workpiece holder 118. The workpiece 58 is clamped in the workpiece holder 118 so that the edge 60 of the workpiece 58 may be precisely located using the probe 12.

Referring next to FIG. 8, the switch 30 is connected between a nine-volt battery 120 and a ground on machine tool 32 through a contact 122 corresponding to the rivet 54 shown in FIG. 2. The switch 124 corresponds to the function of the probe 12 in making a connection to the ground of machine tool 32 through the workpiece. When no contact is made between the probe and the workpiece, the switch 124 is open and the transistor 126 is turned on by base current flowing through resistor 128 from the battery 120. If switch 124 is open so that transistor 126 is on, collector current flows through transistor 126 from the battery 120 through resistor 130 and diode 28 so that diode 28 emits green light.

When transistor 126 is on, the current through resistor 132 is small so that transistor 134 is not allowed to turn on. When transistor 134 is off, diode 26 is not turned on so that diode 26 does not emit any light. Diode 26, is connected between the emitter of transistor 134 and ground from the machine tool 32 through the connector 136. The connector 136 corresponds to the spring-loaded contact 34 shown in FIG. 2. The emitter of transistor 126 is connected to ground through the connector 136.

The base of transistor 126 and resistor 128 are connected together to the switch 124. The resistor 128 is connected between switch 124 and the battery 120. The diode 28 is connected to the collector of transistor 126 and is connected in series with resistor 130 to the battery 120. Resistor 132 is connected between the base of transistor 134 and the common connection between resistor 130 and diode 28. A resistor 138 is connected between the collector of transistor 134 and the battery 120.

The function of connector 136 and contact 122 is to allow the green light emitting diode 28 to light only when adequate electrical contact is made to the machine tool 32 by the electronics box 14. Thus, diode 28 is a means for detecting when adequate electrical contact has been achieved and indicates that the surface of machine tool 32 on which the electronics box 14 is placed is relatively clean and free of oil, grease, and the like.

When electrical contact is made between the probe 12 and the workpiece, the switch 124 is closed so that the transistor 126 is turned off and the current the green diode 28 is reduced so that the green light which it produces is turned off. When transistor 126 is turned off, enough current flows through resistor 130 and 132 into the base of transistor 134 so that transistor 134 turns on. When transistor 134 turns on, current flows from the battery 120 through the resistor 138 and the transistor 134 and the diode 26 so that the diode 26 emits red light. Thus, the emission of red light by the diode 26 indicates to the operator of the electronic edge and center locator 10 that contact has been made by the probe 12 to the workpiece.

Figure 9:
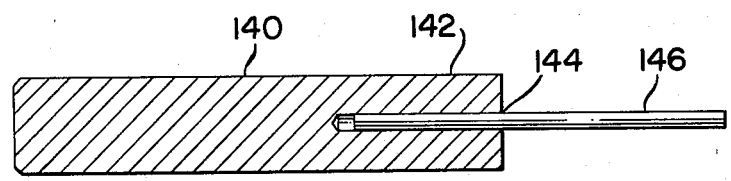
FIG. 9 is a cross sectional view of an alternative embodiment for the probe of this invention.

Referring next to FIG. 9, probe 142 is comparable to the probe 12 shown in FIG. 1 and represents an alternative embodiment. The shank 140 is preferably composed of aluminum having an anodized coating and is substantially identical in construction to the shank 16 shown in FIG. 1. The shank 140 is equipped with an axial bore 144 in the lower end thereof. An elongated, rod-like, cylindrical tip insert 146 is securely mounted inside the bore 144. The tip insert 146 is preferably composed of an electrically conductive, wear resistant material such as steel so that the concentricity of the tip insert is maintained over long periods of abrasive use. It is also preferable that the tip insert 146 be composed of a relatively non-deformable material such as steel so that the tip insert 146 will not be bent out of axial alignment during use. It is important that the tip insert 146 spring back to shape after being bent in use so that the tip 146 remains coaxial with the shank 140 and remains symetric about the axis of the tip 146. For improved performance, it is preferable that the tip insert 146 be composed of steel with a high temper. In the embodiment shown in FIG. 9, it is preferred that the tip insert 146 be press or shrink fit into the bore 144 of the shank 140.

Figure 10:
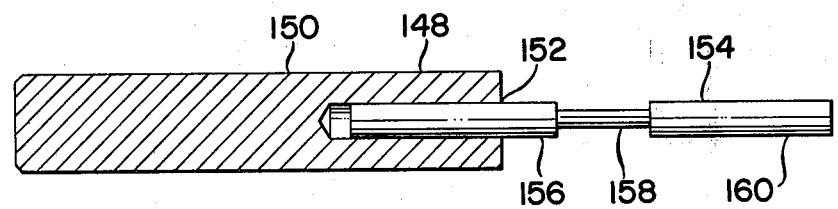
FIG. 10 is a cross sectional view of a further alternative embodiment for the probe of this invention.

Referring next to FIG. 10, the probe 148 is an alternative embodiment for the probe 12 shown in FIG. 1. The probe 148 includes an aluminum shank 150 having an anodized coating and being of substantially identical construction to the shank 16 shown in FIG. 1. The shank 150 is equipped with an elongated, axial bore 152 in the lower end thereof. A tip insert 154 is preferably composed of steel and is press or shrink fitted in to the bore 152. The tip insert 154 consists of a rearward section 156 partially mounted inside the bore 152, a middle, flexure portion 158 mounted on the forward end of the section 156, and a forward section 160 mounted on the forward end of the flexure section 158. It is preferable that each of the sections 156, 158 and 160 be elongated, rod-like cylinders and that the diameter of the section 158 be less than the diameters of the sections 156 and 160. The section 160 is of relatively large diameter (such as 0.2 inches) to allow easy computations to be made, and the section 158 is of relatively small diameter to allow the insert tip 154 to be easily bent. The tip insert 154 is preferably composed of heat treated, high tempered steel so that when bent, permanent deformation does not result. It is preferable that the tip insert 154 is a single length of steel rod, of unitary construction.

The probe 142 of FIG. 9 and the probe 148 of FIG. 10 may be connected to the box 14 of FIG. 1 through the use of a clip (not shown) which may be connected to the wire 24 so that the clip may be placed in gripping contact around the tip insert 146 or tip insert 154 to provide electrical contact therewith. Electrical contact is made with the probes 142 and 148 in an analogous fashion to that used with probe 12 as described above.

What is claimed is:

1. An electronic contact detector for use in aligning a workpiece in a machine tool having a tool holder, said contact detector comprising:
 a probe having an electrically conductive tip for contacting said workpiece, and having an electrically insulative shank for mounting in said tool holder; and
 an electronic contact detection circuit for connecting to said probe and to said machine tool for detecting the electrical continuity between said electrically conductive tip and said workpiece resulting when said probe contacts said workpiece.

2. The electronic contact detector of claim 1 wherein said shank of said probe comprises an aluminum member having an electrically insulating anodized coating.

3. The electronic contact detector of claim 2 wherein said probe is composed of a unitary aluminum member tapering from said shank to said tip.

4. The electronic contact detector of claim 3 wherein said probe has a transverse, connector receiving bore so that an electrical connector may be inserted in said bore when said shank is in said tool holder so that electrical connection is made between said probe and said circuit.

5. The electronic contact detector of claim 2 wherein said tip is composed of material which resists permanent deformation when brought into contact with said workpiece and wherein said tip is attached to said shank.

6. The electronic contact detector of claim 5 wherein said shank has an elongated axial bore in the bottom thereof; wherein said tip fits inside, is secured in, and projects from said bore; and wherein an electrical connector attaches to said tip and makes electrical connection with said detection circuit.

7. The electronic contact detector of claims 5 or 6 wherein said probe has a rearward section, a flexure section, and a forward section; and said flexure section has a diameter less than the diameters of said forward section and said rearward section; and wherein said rearward section is adjacent from said shank, and said forward section is adjacent said tip.

8. The electronic contact detector of claim 1 wherein said circuit includes first and second contacts for contacting said machine tool, and a contact indicator to indicate when electrical contact is made with said machine tool by both of said first and second contacts.

9. The electronic contact detector of claim 1 wherein said tip comprises a circular, flat disk mounted on the lower end of said shank.

10. A method of estimating the location of the center of a circular hole in a workpiece using an electronic contact detector having a contact detecting probe, said method comprising the steps of:
 placing said probe in the approximate center of said hole;
 moving said workpiece back and forth in a first direction to locate a first center line approximation by observing said electronic contact detector to detect when said probe contacts said workpiece;

moving said workpiece back and forth in a second direction perpendicular to said first direction and along said first center line approximation, in order to locate a second center line approximation by observing said electronic contact detector to detect when said probe contacts said workpiece, so that said center of said hole is estimated to be at the intersection of said first and second center line approximations.

11. The method of claim 10 further including a repetition of the steps thereof in order to obtain an improved accuracy estimate of the location of said center of said hole, said step of placing said probe in the approximate center of said hole being performed by placing said probe at the center location estimated in the previous repetition.

12. An electronic edge and center locator for detecting the relative position of a workpiece and a machine tool, said locator comprising:

a probe for mounting in said machine tool and for making electrical contact with said workpiece;

means for electrically insulating said probe from said machine tool; and means for detecting when said probe makes electrical contact with said workpiece.

13. The locator of claim 12 further including:

means for making electrical contact with said machine tool so that electrical contact is made with said workpiece, wherein said means for detecting is connected to said means for making electrical contact in order to detect electrical continuity between said probe and said workpiece; and means for indicating when adequate electrical contact has been made with said machine tool.

14. The locator of claim 12 wherein said means for insulating comprises a thin, uniform oxide layer on said probe.

15. The locator of claim 12 wherein said probe further comprises means for making selective electrical contact with a surface recessed inside said workpiece.

* * * * *